(12) United States Patent
Zhou et al.

(10) Patent No.: US 8,923,892 B2
(45) Date of Patent: Dec. 30, 2014

(54) METHOD AND APPARATUS FOR UPDATING FEMTOCELL PROXIMITY INFORMATION

(75) Inventors: Yan Zhou, San Diego, CA (US); Damanjit Singh, San Diego, CA (US); Farhad Meshkati, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 13/106,725

(22) Filed: May 12, 2011

(65) Prior Publication Data
US 2012/0122492 A1 May 17, 2012

Related U.S. Application Data

(60) Provisional application No. 61/334,934, filed on May 14, 2010.

(51) Int. Cl.
*H04W 24/00* (2009.01)
*H04W 36/00* (2009.01)
*H04W 84/04* (2009.01)
*H04W 64/00* (2009.01)
*H04W 8/00* (2009.01)

(52) U.S. Cl.
CPC ........ *H04W 36/0083* (2013.01); *H04W 84/045* (2013.01); *H04W 64/00* (2013.01); *H04W 8/005* (2013.01)
USPC .................. 455/456.6; 455/456.1; 455/456.2; 455/456.3; 455/456.5; 455/444; 455/434

(58) Field of Classification Search
CPC .... H04W 84/045; H04W 64/00; H04W 8/005
USPC .......... 455/456.6, 456.1, 456.2, 456.3, 456.5, 455/444, 434
See application file for complete search history.

(56) References Cited

U.S. PATENT DOCUMENTS

| 4,707,841 A | 11/1987 | Yen et al. |
| 5,093,926 A | 3/1992 | Sasuta |

(Continued)

FOREIGN PATENT DOCUMENTS

| CN | 1129509 A | 8/1996 |
| CN | 1207859 A | 2/1999 |

(Continued)

OTHER PUBLICATIONS

Bender, P., et al., "CDMA/HDR: A Bandwidth-Efficient High-speed Wireless Data Service for Nomadic Users" IEEE Communications Magazine, IEEE Service Center, Piscataway, US, vol. 38, No. 7, Jul. 1, 2000, pp. 70-77, XP010091318.

(Continued)

*Primary Examiner* — Barry Taylor
(74) *Attorney, Agent, or Firm* — Fariba Yadegar-Bandari

(57) ABSTRACT

Techniques are described herein for updating proximity information associated with a femtocell in a wireless communication system. An example of a method described herein includes identifying a location within a wireless communication network, associating the location with a femtocell for which proximity information relating to position of the femtocell is maintained, performing at least one search for the femtocell, and updating the proximity information maintained for the femtocell based on results of the at least one search. Another example of a method described herein includes obtaining a report of proximity information relating to a femtocell, identifying one or more network devices for which the proximity information is relevant, and communicating proximity information update signaling to the one or more network devices.

64 Claims, 10 Drawing Sheets

(56) References Cited

U.S. PATENT DOCUMENTS

| | | | |
|---|---|---|---|
| 5,640,677 A | 6/1997 | Karlsson | |
| 5,896,573 A | 4/1999 | Yang et al. | |
| 5,983,097 A | 11/1999 | Kakinuma et al. | |
| 6,031,829 A | 2/2000 | Dupuy et al. | |
| 6,167,268 A | 12/2000 | Souissi et al. | |
| 6,529,491 B1 | 3/2003 | Chang et al. | |
| 6,539,491 B1 | 3/2003 | Skergan et al. | |
| 6,590,881 B1 | 7/2003 | Wallace et al. | |
| 6,621,811 B1 | 9/2003 | Chang et al. | |
| 6,956,527 B2 | 10/2005 | Rogers et al. | |
| 6,983,156 B2 | 1/2006 | Fukushima et al. | |
| 6,999,778 B2 | 2/2006 | DiBuduo | |
| 7,020,111 B2 | 3/2006 | Ozluturk et al. | |
| 7,054,627 B1 | 5/2006 | Hillman | |
| 7,254,407 B1 | 8/2007 | Bokish | |
| 7,263,370 B1 | 8/2007 | Infosino | |
| 7,289,541 B2 | 10/2007 | Elam | |
| 7,319,878 B2 | 1/2008 | Sheynblat et al. | |
| 7,340,278 B2 | 3/2008 | Nakada | |
| 7,346,321 B2 | 3/2008 | Backes | |
| 7,395,074 B2 | 7/2008 | Syrjarinne | |
| 7,433,694 B2 | 10/2008 | Morgan et al. | |
| 7,477,920 B2 | 1/2009 | Scheinert et al. | |
| 7,715,471 B2 | 5/2010 | Werner et al. | |
| 7,840,985 B2 | 11/2010 | MacInnis | |
| 8,045,638 B2 | 10/2011 | Grant et al. | |
| 8,169,982 B2 | 5/2012 | Gogic et al. | |
| 2002/0082044 A1 | 6/2002 | Davenport | |
| 2003/0022686 A1 | 1/2003 | Soomro et al. | |
| 2003/0048758 A1 | 3/2003 | Jones et al. | |
| 2003/0118015 A1 | 6/2003 | Gunnarsson et al. | |
| 2003/0144006 A1 | 7/2003 | Johansson et al. | |
| 2003/0214937 A1 | 11/2003 | Lindoff et al. | |
| 2004/0071119 A1 | 4/2004 | Ishikawa et al. | |
| 2004/0147232 A1 | 7/2004 | Zodnik | |
| 2004/0162084 A1 | 8/2004 | Wang | |
| 2004/0166886 A1 | 8/2004 | Laroia et al. | |
| 2005/0009521 A1 | 1/2005 | Preece | |
| 2005/0018597 A1 | 1/2005 | Yuda et al. | |
| 2005/0037775 A1 | 2/2005 | Moeglein et al. | |
| 2005/0078033 A1 | 4/2005 | Tamaki et al. | |
| 2005/0227689 A1 | 10/2005 | Jewett | |
| 2005/0246334 A1 | 11/2005 | Tao et al. | |
| 2005/0250496 A1 | 11/2005 | Hason et al. | |
| 2005/0272444 A1 | 12/2005 | Heffield et al. | |
| 2006/0016850 A1 | 1/2006 | Yoshie | |
| 2006/0045134 A1 | 3/2006 | Eldon et al. | |
| 2006/0052067 A1 | 3/2006 | Singh et al. | |
| 2006/0148486 A1 | 7/2006 | Kim et al. | |
| 2006/0234739 A1 | 10/2006 | Thadasina et al. | |
| 2007/0002813 A1 | 1/2007 | Tenny et al. | |
| 2007/0004428 A1 | 1/2007 | Morgan et al. | |
| 2007/0019586 A1 | 1/2007 | Nanda et al. | |
| 2007/0030956 A1 | 2/2007 | Hornig | |
| 2007/0097939 A1 | 5/2007 | Nylander et al. | |
| 2007/0105527 A1 | 5/2007 | Nylander et al. | |
| 2007/0121560 A1 | 5/2007 | Edge | |
| 2007/0178914 A1 | 8/2007 | Montenegro | |
| 2007/0184185 A1 | 8/2007 | Besinger et al. | |
| 2007/0184845 A1 | 8/2007 | Troncoso | |
| 2007/0238448 A1 | 10/2007 | Gallagher et al. | |
| 2008/0153533 A1 | 6/2008 | Claussen et al. | |
| 2009/0034501 A1 | 2/2009 | Hahm et al. | |
| 2009/0061821 A1 | 3/2009 | Chen et al. | |
| 2009/0092111 A1 | 4/2009 | Horn et al. | |
| 2009/0098873 A1 | 4/2009 | Gogic | |
| 2009/0098885 A1 | 4/2009 | Gogic et al. | |
| 2009/0122773 A1 | 5/2009 | Gogic | |
| 2009/0156165 A1 | 6/2009 | Raghothaman et al. | |
| 2009/0163227 A1 | 6/2009 | Collins | |
| 2009/0221287 A1 | 9/2009 | Balasubramanian et al. | |
| 2010/0054206 A1 | 3/2010 | Kalhan | |
| 2010/0056177 A1 | 3/2010 | Kojima | |
| 2010/0069066 A1 | 3/2010 | Shen et al. | |
| 2010/0120394 A1* | 5/2010 | Mia et al. | 455/404.2 |
| 2010/0130212 A1* | 5/2010 | So et al. | 455/444 |
| 2010/0178916 A1* | 7/2010 | Jamadagni | 455/434 |
| 2010/0240397 A1* | 9/2010 | Buchmayer et al. | 455/456.1 |
| 2010/0246529 A1 | 9/2010 | Ishizu et al. | |
| 2010/0260052 A1 | 10/2010 | Cho et al. | |
| 2010/0304741 A1 | 12/2010 | Gogic et al. | |
| 2010/0329206 A1* | 12/2010 | Thome et al. | 370/331 |
| 2011/0105128 A1* | 5/2011 | Narasimha | 455/442 |
| 2011/0130115 A1* | 6/2011 | Venkatachalam | 455/410 |
| 2011/0134833 A1 | 6/2011 | Gogic | |
| 2011/0170481 A1* | 7/2011 | Gomes et al. | 370/328 |
| 2011/0205932 A1* | 8/2011 | Ekici et al. | 370/254 |
| 2012/0015649 A1* | 1/2012 | Li et al. | 455/434 |
| 2012/0106349 A1* | 5/2012 | Adjakple et al. | 370/241 |
| 2012/0108199 A1* | 5/2012 | Wang et al. | 455/405 |
| 2012/0142362 A1* | 6/2012 | Mori | 455/449 |
| 2012/0220310 A1 | 8/2012 | Gogic et al. | |

FOREIGN PATENT DOCUMENTS

| | | |
|---|---|---|
| CN | 1894979 A | 1/2007 |
| EP | 0865172 A2 | 9/1998 |
| EP | 0973271 A1 | 1/2000 |
| EP | 1037482 A2 | 9/2000 |
| EP | 1119137 A1 | 7/2001 |
| EP | 1298847 A1 | 4/2003 |
| EP | 1365613 A1 | 11/2003 |
| EP | 1739881 A1 | 1/2007 |
| EP | 1848125 | 10/2007 |
| EP | 2073163 A1 | 6/2009 |
| GB | 2313257 A | 11/1997 |
| GB | 2389005 | 11/2003 |
| GB | 2398970 | 9/2004 |
| GB | 2446847 A | 8/2008 |
| JP | 10221425 A | 8/1998 |
| JP | 2003506960 A | 2/2003 |
| JP | 2003519995 T | 6/2003 |
| JP | 2004297121 A | 10/2004 |
| JP | 2004320473 A | 11/2004 |
| JP | 2004535575 T | 11/2004 |
| JP | 2005509136 A | 4/2005 |
| JP | 2005123662 A | 5/2005 |
| JP | 2006074468 A | 3/2006 |
| JP | 2006508603 A | 3/2006 |
| JP | 2006186551 A | 7/2006 |
| JP | 2007520146 A | 7/2007 |
| JP | 2009504018 A | 1/2009 |
| JP | 2009504019 A | 1/2009 |
| JP | 2009510973 A | 3/2009 |
| JP | 2010074779 A | 4/2010 |
| JP | 2010081118 A | 4/2010 |
| KR | 20080079946 A | 9/2008 |
| RU | 2113772 C1 | 6/1998 |
| RU | 2197780 C2 | 1/2003 |
| RU | 2296436 C2 | 3/2007 |
| RU | 2007134181 A | 3/2009 |
| RU | 2360378 C1 | 6/2009 |
| WF | 03081939 A1 | 10/2003 |
| WO | 9501706 A1 | 1/1995 |
| WO | 9919743 A1 | 4/1999 |
| WO | 0075684 A1 | 12/2000 |
| WO | 0111804 A1 | 2/2001 |
| WO | 0115340 A1 | 3/2001 |
| WO | WO-0239759 A2 | 5/2002 |
| WO | 02082832 | 10/2002 |
| WO | 03001687 A2 | 1/2003 |
| WO | WO-03010552 A2 | 2/2003 |
| WO | 03100647 A1 | 12/2003 |
| WO | 03101138 A1 | 12/2003 |
| WO | 2004051887 A2 | 6/2004 |
| WO | 2004052041 A1 | 6/2004 |
| WO | 2004077753 A2 | 9/2004 |
| WO | 2005039214 A1 | 4/2005 |
| WO | WO-2005036836 A1 | 4/2005 |
| WO | 2005057834 A2 | 6/2005 |
| WO | WO-2005076656 A1 | 8/2005 |
| WO | 2005088991 A1 | 9/2005 |
| WO | 2007022005 A2 | 2/2007 |
| WO | 2007040449 A1 | 4/2007 |

(56) References Cited

FOREIGN PATENT DOCUMENTS

| WO | 2007040454 | A2 | 4/2007 |
|---|---|---|---|
| WO | 2007112559 | A1 | 10/2007 |
| WO | 2008030956 | A2 | 3/2008 |
| WO | 2008055251 | | 5/2008 |
| WO | 2008076222 | | 6/2008 |
| WO | 2008109842 | | 9/2008 |
| WO | 2008131588 | | 11/2008 |
| WO | 2008131591 | | 11/2008 |
| WO | 2008136416 | | 11/2008 |
| WO | WO-2009108811 | A1 | 9/2009 |
| WO | WO-2009116427 | A1 | 9/2009 |
| WO | 2009120902 | A1 | 10/2009 |

OTHER PUBLICATIONS

Dimitri Rubin and Todd Young: "Femtocells Bridging Reliable Location and Timing Indoors" INSIDEGNSS, vol. 3, No. 7, 2008, pp. 40-46, XP002520000 the whole document.

EE624 Mobile Communications Systems (MCS) in: Spread Spectrum Systems, Communication Networks Research Lab, (Fall 2000).
International Search Report and Written Opinion—PCT/US2011/036707, ISA/EPO—Oct. 6, 2011.
3GPP TS 25.133 V8.10.0 (Mar. 2010), 3rd Generation Partnership Project; Technical Specification Group Radio Access Network; Requirements for support of radio resource management (FDD) (Release 8), 236 pp.
Universal Mobile Telecommunications, System (UMTS); Radio Resource Control, (RRC); Protocol specification (3GPP TS 25.331 version 9.1.0 Release 9), Technical Specification, European Telecommunications Standards Institute (ETSI), 650, Route Des Lucioles; F-06921 Sophia-Antipolis; France, vol. 3GPP RAN 2, No. V9.1.0, Feb. 1, 2010, XP014046584, p. 461-p. 467 p. 1684-p. 1685, paragraph 14.7a p. 1688, paragraph 14.11.1—p. 1690, paragraph 14.11.2.
Taiwan Search Report—TW100116892—TIPO—Dec. 16, 2013.

\* cited by examiner

METHOD AND APPARATUS FOR UPDATING FEMTOCELL PROXIMITY INFORMATION

CROSS-REFERENCES TO RELATED APPLICATIONS

This application claims priority to U.S. Provisional Patent Application No. 61/334,934, filed May 14, 2010, entitled "METHOD AND APPARATUS THAT FACILITATES UPDATING PROXIMITY INFORMATION ASSOCIATED WITH ACCESS POINT BASE STATIONS,", all of which is hereby incorporated herein by reference for all purposes.

BACKGROUND

Wireless communication devices are incredibly widespread in today's society. For example, people use cellular phones, smart phones, personal digital assistants, laptop computers, pagers, tablet computers, etc. to send and receive data wirelessly from countless locations. Moreover, advancements in wireless communication technology have greatly increased the versatility of today's wireless communication devices, enabling users to perform a wide range of tasks from a single, portable device that conventionally required either multiple devices or larger, non-portable equipment.

A mobile device communicates within a cellular communications environment via a system of network cells that provide communication coverage for corresponding geographic areas. Such networks conventionally include macrocells, which provide communication coverage for a substantially large geographic area (e.g., covering a radius of over 2 km, etc.). To improve network coverage and capacity for a more limited area, such as that corresponding to a building or other indoor area, smaller scale cells, such as femtocells, may be employed. A femtocell connects to an associated communications network via a broadband connection (e.g., digital subscriber line (DSL), cable, fiber-optic, etc.) to extend coverage of the communications network to a limited number of devices within a coverage area of the femtocell.

In conventional proximity-based femtocell search, a mobile device memorizes the proximity of an accessible femtocell it encounters. Based on this memorized proximity, the mobile device initiates a search for that femtocell when the device returns into the proximity of the femtocell. However, the memorized proximity of a femtocell may become obsolete, and as a consequence no longer valid, if the femtocell is relocated, shut down, etc. Further, as a mobile device stores proximity information only for femtocells that have previously been visited, the mobile device may utilize significant resources in searching for and locating new femtocells. Further, the mobile device may be configured to report such invalid proximity information to its associated network, which may adversely impact the capacity of the network.

SUMMARY

An example of a mobile wireless communication device includes a positioning module configured to identify a location of the device, a proximity store module communicatively coupled to the positioning module and configured to maintain proximity data for a femtocell and to associate the femtocell with the location of the device, and a proximity update module communicatively coupled to the proximity store module and configured to perform at least one search for the femtocell and to update the proximity data maintained for the femtocell according to results of the at least one search.

Implementations of the device may include one or more of the following features. The proximity update module is further configured to discard the proximity data maintained for the femtocell if the femtocell is not found in N consecutive searches for a positive integer N. The proximity update module is further configured to discard the proximity data maintained for the femtocell if the femtocell is not found via the at least one search within an allotted time. The proximity update module is further configured to maintain an obsoleteness level for the femtocell and to update the obsoleteness level of the femtocell according to the results of the at least one search. The proximity update module is further configured to discard the proximity data maintained for the femtocell if the obsoleteness level for the femtocell exceeds a threshold. The proximity update module is further configured to perform searches for the femtocell at a rate determined according to the obsoleteness level for the femtocell. The proximity update module is further configured to increase the obsoleteness level for the femtocell if the femtocell is not found in N consecutive searches conducted at periods of a time interval for a positive integer N. The proximity update module is further configured to increase the obsoleteness level for the femtocell if the femtocell is not found via the at least one search within an allotted time. The proximity update module is further configured to update the proximity data maintained for the femtocell according to received proximity update signaling. The proximity update module is further configured to modify a schedule on which at least a portion of the proximity data maintained for the femtocell is transmitted to an associated wireless communication network.

An example of a femtocell proximity management system includes a receiver configured to obtain a proximity data report relating to a femtocell, a user selection module configured to identify one or more network users for which the proximity data report is relevant, a signaling generator module communicatively coupled to the receiver and configured to generate proximity data update signaling based on the proximity data report, and a transmitter communicatively coupled to the user selection module and the signaling generator module and configured to transmit the proximity data update signaling to the one or more network users identified by the user selection module.

Implementations of the system may include one or more of the following features. The user selection module is further configured to identify the one or more network users for which the proximity data report is relevant based on access restrictions of the femtocell. The transmitter is further configured to transmit the proximity data update signaling within a transmission of additional information relating to the femtocell. The transmitter is further configured to transmit the proximity data update signaling in response to at least one of expiration of an allotted amount of time or a modification of proximity data associated with the femtocell.

Another example of a mobile wireless communication device includes a proximity store module configured to maintain proximity data for a femtocell, a receiver configured to obtain proximity data update signaling relating to the femtocell, and a proximity update module communicatively coupled to the proximity store module and the receiver and configured to update the proximity data for the femtocell based on the proximity data update signaling.

Implementations of the device may include one or more of the following features. A transmitter communicatively coupled to the proximity store module and configured to report proximity data relating to one or more femtocells to a proximity information management entity within a wireless communication network or a serving cell within the wireless communication network. The receiver is further configured to receive control signaling having the proximity data update signaling embedded therein. The proximity update module is further configured to perform at least one search for the femtocell and to update the proximity data maintained for the femtocell according to results of the at least one search.

An example of a method includes identifying a location within a wireless communication network, associating the location with a femtocell for which proximity information relating to position of the femtocell is maintained, performing at least one search for the femtocell, and updating the proximity information maintained for the femtocell based on results of the at least one search.

Implementations of the method may include one or more of the following features. The updating includes discarding the proximity information maintained for the femtocell if the femtocell is not found in one or more of the at least one search. The performing includes performing searches for the femtocell at intervals of a proximity search period and the updating further includes discarding the proximity information maintained for the femtocell if the femtocell is not found in N consecutive searches for a positive integer N. The updating further includes discarding the proximity information maintained for the femtocell if the femtocell is not found via the at least one search within an allotted time interval. The updating includes maintaining an obsoleteness level for the femtocell and increasing the obsoleteness level for the femtocell if the femtocell is not found in one or more of the at least one search. The performing includes performing searches for the femtocell at a rate determined according to the obsoleteness level for the femtocell. The updating further includes discarding the proximity information maintained for the femtocell if the obsoleteness level for the femtocell exceeds an allotted obsoleteness threshold. The performing includes performing searches for the femtocell at intervals of a proximity search period and the updating further includes increasing the obsoleteness level for the femtocell if the femtocell is not found in N consecutive searches for a positive integer N. The updating further includes increasing the obsoleteness level for the femtocell if the femtocell is not found via the at least one search within an allotted time interval. The proximity information includes at least one of satellite positioning system coordinates, cell identifiers, device addresses, MAC addresses, observed signal strengths, observed signal-to-noise ratio of at least one of a cellular, television or radio system, observed carrier frequencies or associated radio access technologies. Updating the proximity information maintained for the femtocell based on update information received from the wireless communication network. The updating further includes altering a schedule on which at least a portion of the proximity information maintained for the femtocell is transmitted to the wireless communication network.

Another example of a method includes obtaining a report of proximity information relating to a femtocell, identifying one or more network devices for which the proximity information is relevant, and communicating proximity information update signaling to the one or more network devices.

Implementations of the method may include one or more of the following features. The obtaining includes obtaining the report from at least one of a mobile device, the femtocell, a femtocell management system or a femtocell gateway. The identifying includes identifying the one or more network devices based on access restrictions of the femtocell. The communicating includes communicating the proximity information update signaling within a transmission of additional information relating to the femtocell. The communicating further includes communicating the proximity information update signaling to ones of the one or more network devices operating in a connected mode. The communicating includes communicating the proximity information update signaling based on at least one of a transmission period or a modification of parameters related to the femtocell.

A further example of a method includes identifying a femtocell within a wireless communication network for which proximity information is maintained, receiving proximity information update signaling relating to the femtocell, and updating the proximity information maintained for the femtocell based on the proximity information update signaling.

Implementations of the method may include one or more of the following features. Reporting proximity information relating to one or more femtocells to a proximity information management entity within the wireless communication network. Reporting proximity information relating to one or more femtocells to a serving cell within the wireless communication network. The receiving includes receiving the proximity information update signaling embedded within a transmission of control signaling from the wireless communication network.

An example of a mobile wireless communication device includes means for identifying a location of the device, means for maintaining proximity data for a femtocell, means for associating the femtocell with the location of the device, means for performing at least one search for the femtocell, and means for updating the proximity data maintained for the femtocell according to results of the at least one search.

Implementations of the device may include one or more of the following features. The means for updating is configured to discard the proximity data maintained for the femtocell upon at least one selected event from a plurality of events, and the plurality of events include the femtocell not being found in N searches for a positive integer N and the femtocell not being found within an allotted time. The means for updating is configured to maintain an obsoleteness level for the femtocell and to update the obsoleteness level of the femtocell according to the results of the at least one search. The means for updating is configured to increase the obsoleteness level for the femtocell upon at least one selected event from a plurality of events, and the plurality of events include the femtocell not being found in N searches for a positive integer N and the femtocell not being found within an allotted time. The means for updating is configured to perform at least one of discarding the proximity data maintained for the femtocell or decreasing a rate at which the means for performing searches for the femtocell if the obsoleteness level for the femtocell exceeds a threshold.

An example of a femtocell proximity management system includes means for receiving a proximity data report relating to a femtocell, means for identifying one or more network devices for which the proximity data report is relevant, means for generating proximity data update signaling based on the proximity data report, and means for transmitting the proximity data update signaling to the one or more network devices identified by the means for identifying.

Implementations of the device may include one or more of the following features. The means for transmitting is configured to transmit the proximity data update signaling within a transmission of additional information relating to the femtocell. The means for transmitting is configured to transmit the proximity data update signaling in response to at least one of expiration of an allotted amount of time or a modification of proximity data associated with the femtocell.

An example of a mobile wireless communication device includes means for maintaining proximity data for a femtocell, means for receiving proximity data update signaling relating to the femtocell, and means for updating the proximity data for the femtocell based on the proximity data update signaling.

Implementations of the device may include one or more of the following features. The means for receiving is configured to receive control signaling having the proximity data update signaling embedded therein.

An example of a computer program product resides on a non-transitory processor-readable medium and includes processor-readable instructions configured to cause a processor to identify a location within a wireless communication network, associate the location with a femtocell for which proximity information relating to position of the femtocell is maintained, perform at least one search for the femtocell, and update the proximity information maintained for the femtocell based on results of the at least one search.

Implementations of the computer program product may include one or more of the following features. The instructions configured to cause the processor to update are configured to cause the processor to discard the proximity data maintained for the femtocell upon at least one selected event from a plurality of events, and the plurality of events include the femtocell not being found in N searches for a positive integer N and the femtocell not being found within an allotted time. The instructions configured to cause the processor to update are configured to cause the processor to maintain an obsoleteness level for the femtocell and to update the obsoleteness level of the femtocell according to the results of the at least one search. The instructions configured to cause the processor to update are configured to cause the processor to discard the proximity data maintained for the femtocell or decrease a rate at which the means for performing searches for the femtocell if the obsoleteness level for the femtocell exceeds a threshold.

Another example of a computer program product resides on a non-transitory processor-readable medium and includes processor-readable instructions configured to cause a processor to obtain a report of proximity information relating to a femtocell, identify one or more network devices for which the proximity information is relevant, and communicate proximity information update signaling to the one or more network devices.

Implementations of the computer program product may include one or more of the following features. The instructions configured to cause the processor to communicate are configured to cause the processor to transmit the proximity information update signaling within a transmission of additional information relating to the femtocell. The instructions configured to cause the processor to communicate are configured to cause the processor to transmit the proximity information update signaling in response to at least one of expiration of an allotted amount of time or a modification of proximity information associated with the femtocell.

A further example of a computer program product resides on a non-transitory processor-readable medium and includes processor-readable instructions configured to cause a processor to identify a femtocell within a wireless communication network for which proximity information is maintained, receive proximity information update signaling relating to the femtocell, and update the proximity information maintained for the femtocell based on the proximity information update signaling.

Implementations of the computer program product may include one or more of the following features. The instructions configured to cause the processor to receive are configured to cause the processor to receive control signaling having the proximity information update signaling embedded therein.

Items and/or techniques described herein may provide one or more of the following capabilities, as well as other capabilities not mentioned. Utilization of mobile device power in association with searching for new and/or obsolete femtocells can be reduced or eliminated. Mobile device efficiency associated with femtocell usage can be increased. Efficient femtocell proximity data updating can be flexibly applied to any wireless communication technology and can be implemented at a mobile device and/or a communication network according to device capability. Network capacity can be increased via reduction of superfluous proximity information reports. While at least one item/technique-effect pair has been described, it may be possible for a noted effect to be achieved by means other than that noted, and a noted item/technique may not necessarily yield the noted effect.

DETAILED DESCRIPTION

Figure 1:
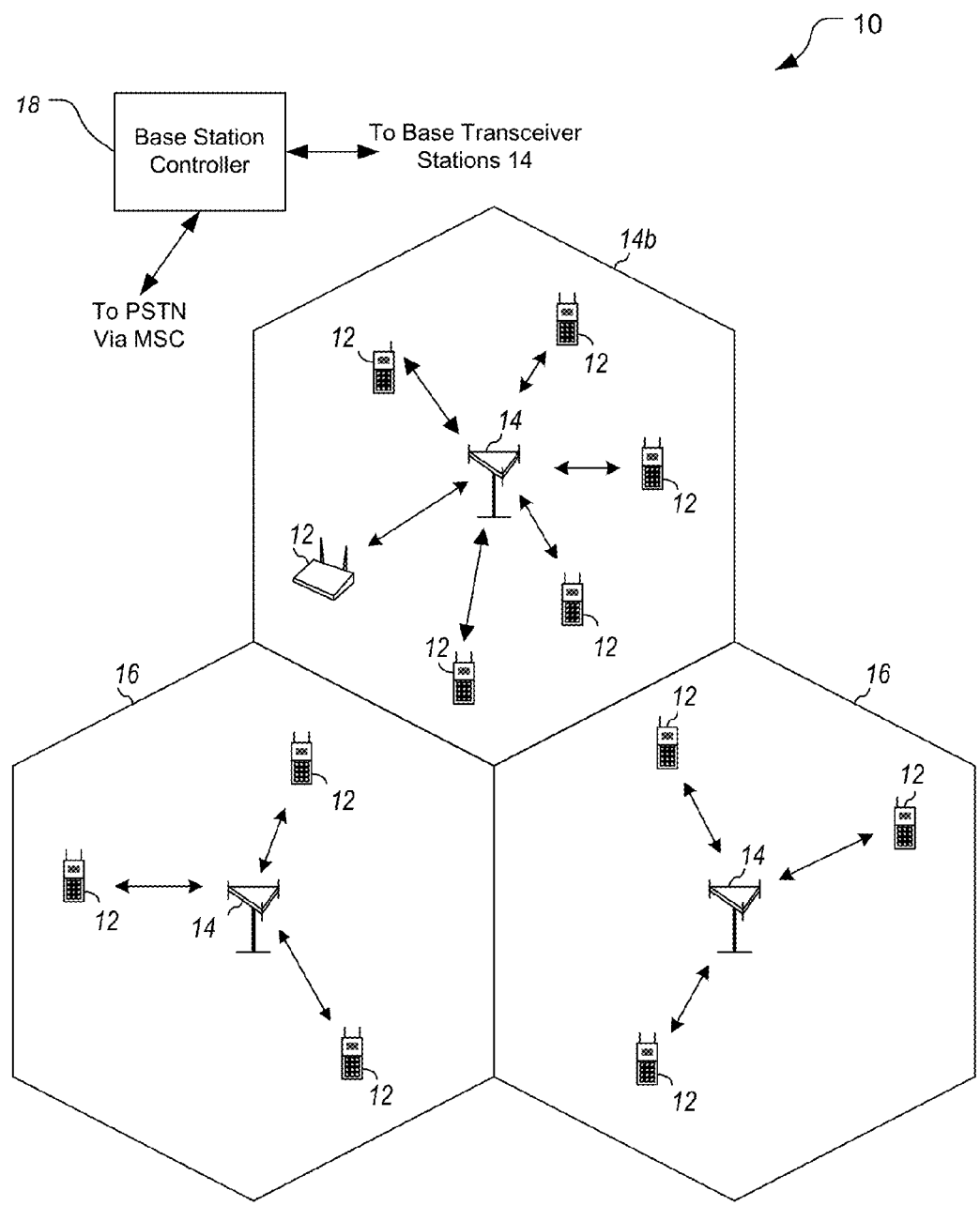
FIG. 1 is a schematic diagram of a wireless telecommunication system.

The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

Techniques are described herein for updating proximity information associated with femtocells or other entities in a wireless communication network. The term "proximity information" is defined as any information that aids a mobile device in determining its proximity to a network cell. Proximity information can include, but is not limited to, SPS coordinates of a femtocell, the set of cell identifiers of macrocells across different carriers, media access control (MAC) addresses, street addresses or latitude/longitude information corresponding to a femtocell, observed signal-to-noise ratio of at least one of a cellular, television or radio system, observed carrier frequencies or associated radio access technologies, etc.

Referring to FIG. 1, a wireless communication system 10 includes mobile access terminals 12 (ATs), base transceiver stations (BTSs) or base stations 14 disposed in cells 16, and a base station controller (BSC) 18. The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The base stations 14 can wirelessly communicate with the mobile devices 12 via antennas. Each of the base stations 14 may also be referred to as a base station, an access point, an access node (AN), a Node B, an evolved Node B (eNB), etc. The base stations 14 are configured to communicate with the mobile devices 12 under the control of the BSC 18 via multiple carriers. Each of the base stations 14 can provide communication coverage for a respective geographic area, here the respective cells 16. Each of the cells 16 of the base stations 14 is partitioned into multiple sectors as a function of the base station antennas.

The system 10 may include only macro base stations 14 or it can have base stations 14 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femtocell) and may allow restricted access by terminals having association with the femtocell (e.g., terminals for users in a home).

The mobile devices 12 can be dispersed throughout the cells 16. The mobile devices 12 may be referred to as terminals, mobile stations, mobile devices, user equipment (UE), subscriber units, etc. The mobile devices 12 shown in FIG. 1 include cellular phones and a wireless router, but can also include personal digital assistants (PDAs), other handheld devices, netbooks, notebook computers, etc.

Figure 2:
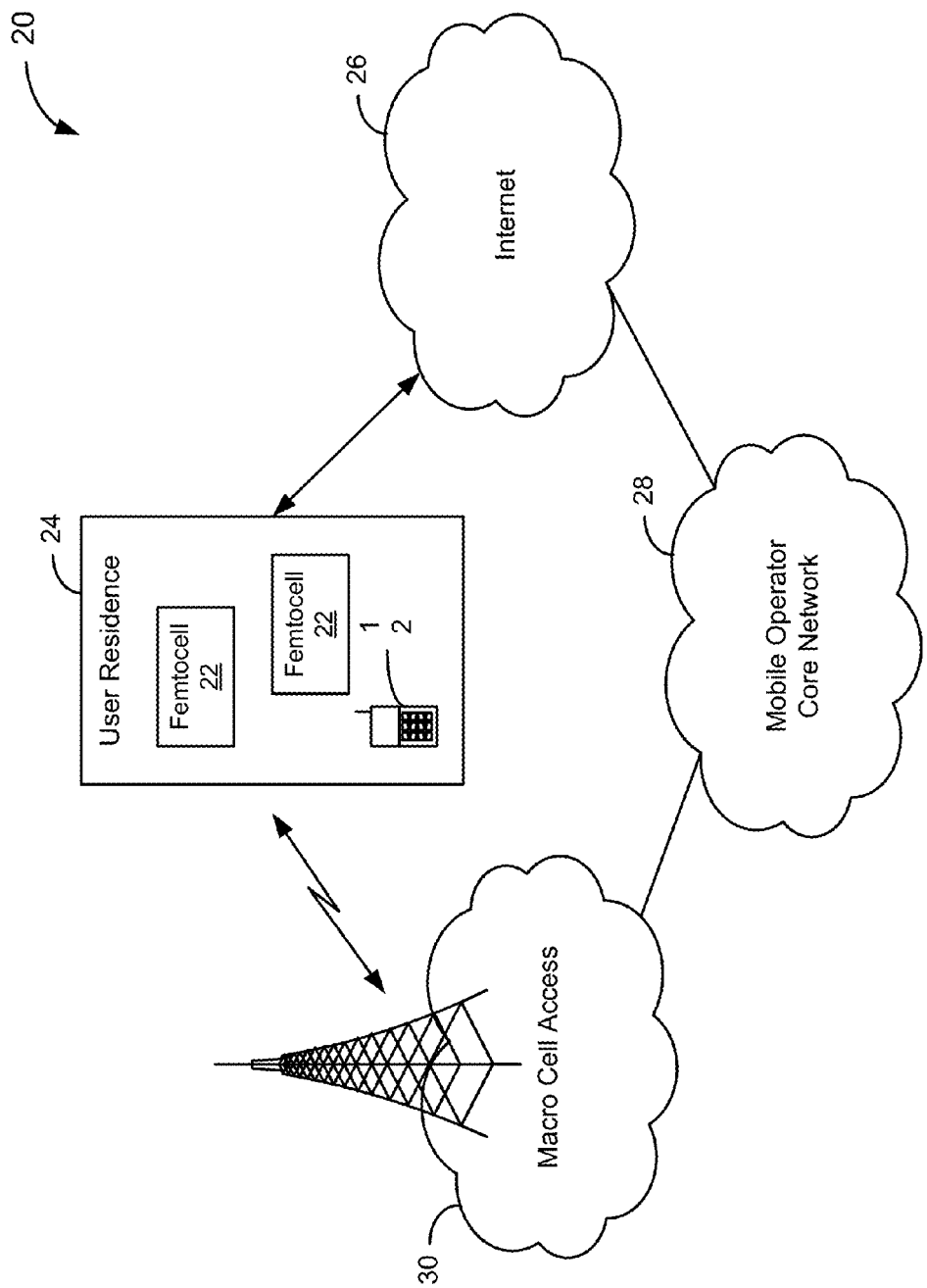
FIG. 2 is a block diagram of a wireless communication system employing femtocells.

Referring to FIG. 2, a communication system 20 is shown that enables deployment of femtocells 22 within an example network environment. System 20 can include multiple femtocells 22 (also referred to as access point base stations (APBSs), Home Node B units (HNBs), Home Evolved Node B units (HeNBs), etc.). femtocells 22 are associated with a small scale network environment, such as, for example, a user residence 24, or other suitable areas such as an office building, a store or other business, etc. The femtocells 22 can also be configured to serve associated and/or alien mobile devices 12. Here, femtocells 22 are coupled to the Internet 26 and a mobile operator core network 28 via a broadband connection implemented by a digital subscriber line (DSL) router, a cable modem, a fiber-optic connection, etc. An owner of a femtocell or femtocell 22 can subscribe to mobile communications service offered through mobile operator core network 28. Accordingly, the mobile device 12 can operate both in a macro cellular environment 30 and in a residential small scale network environment.

Mobile devices 12 can in some cases be served by a set of femtocells 22 (e.g., femtocells 22 that reside within a user residence 24) in addition to a macro cell mobile network 30. As defined herein, a "home" APBS is a base station on which a mobile device is authorized to operate, a guest APBS refers to a base station on which a mobile device is temporarily authorized to operate, and an alien APBS is a base station on which the mobile device is not authorized to operate. An femtocell 22 can be deployed on a single frequency or on multiple frequencies, which may overlap with respective macro cell frequencies.

Figure 3:
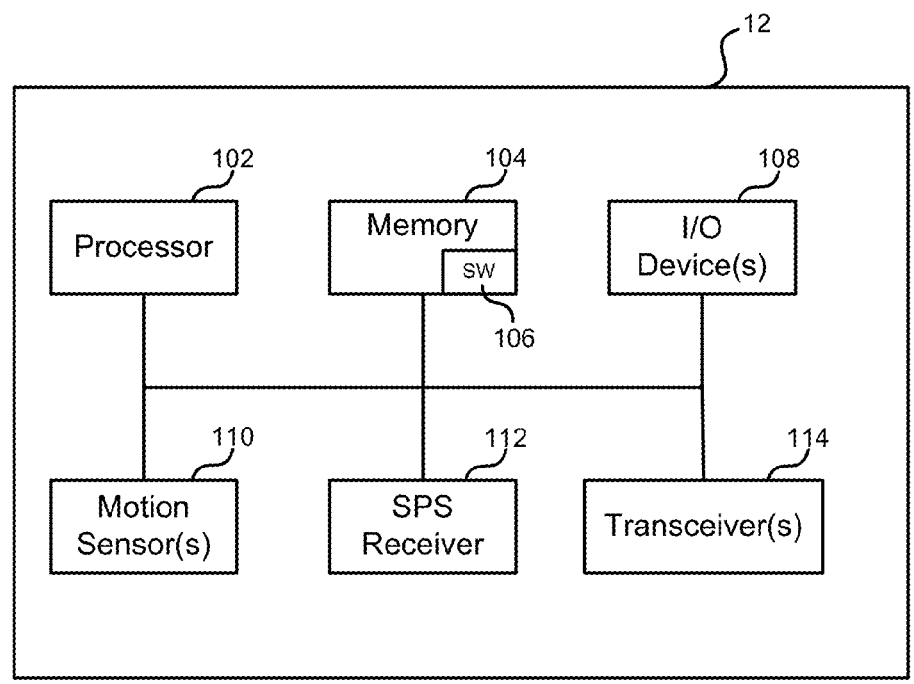
FIG. 3 is a block diagram of components of a mobile station shown in FIG. 1.

Referring next to FIG. 3, an example one of the mobile devices 12 shown in FIG. 1 comprises a computer system including a processor 102, memory 104 including software 106, input/output (I/O) devices 108 (e.g., a display, speaker, keypad, touch screen or touchpad, etc.), motion sensors 110, a satellite positioning system (SPS) receiver 112, and transceivers 114. The transceivers 114 include one or more antennas configured to communicate bi-directionally with the base stations 14. Here, the processor 102 is an intelligent hardware device, e.g., a central processing unit (CPU) such as those made by Intel® Corporation or AMD®, a microcontroller, an application specific integrated circuit (ASIC), etc. The memory 104 includes non-transitory storage media such as random access memory (RAM) and read-only memory (ROM). The memory 104 stores the software 106 which is computer-readable, computer-executable software code containing instructions that are configured to, when executed, cause the processor 102 to perform various functions described herein. Alternatively, the software 106 may not be directly executable by the processor 102 but is configured to cause the computer, e.g., when compiled and executed, to perform the functions.

The motion sensors 110 are configured to collect data relating to motion and/or orientation of the mobile device 12 as well as changes in the motion and/or orientation of the mobile device 12 over time. The motion sensors 110 can include, e.g., a gyroscope, accelerometer, magnetometer, etc. The motion sensors 110 are configured to provide information from which the motion direction and/or orientation of the mobile device 12 can be determined, e.g., with respect to the earth. In turn, the direction and/or orientation of the mobile device 12 can be used to infer or aid in inferring the location of the mobile device 12, e.g., by dead reckoning or other means.

The motion sensors 110 can provide information over time, e.g., periodically, such that present and past orientations and/or motion directions can be compared to determine changes in the motion direction and/or orientation of the mobile device 12. For example, a gyroscope can provide information as to motion of the mobile device 12 affecting the orientation. An accelerometer can be configured to provide information as to gravitational acceleration such that the direction of gravity relative to the mobile device 12 can be determined A magnetometer can be configured to provide an indication of the direction (e.g., in three dimensions) of magnetic north relative to the mobile device 12. Magnetic declination and/or other compensating factors can be used to relate magnetic north to true north, or vice versa. Other motion sensors 110 can also be used.

The SPS receiver 112 includes appropriate equipment for monitoring navigation signals from satellites associated with a SPS (e.g., Global Positioning System (GPS), GLONASS, Galileo, Beidou, etc.) and determining position of the mobile device 12. For example, the SPS receiver 112 includes one or more SPS antennas, and can either communicate with the processor 102 to determine location information or can use its own processor for processing the received satellite navigation signals to determine the location of the mobile device 12. Further, the SPS receiver 112 can communicate with other entities such as a position determination entity and/or the base station 14 in order to send and/or receive assistance information for use in determining the location of the mobile device 12.

Figure 4:
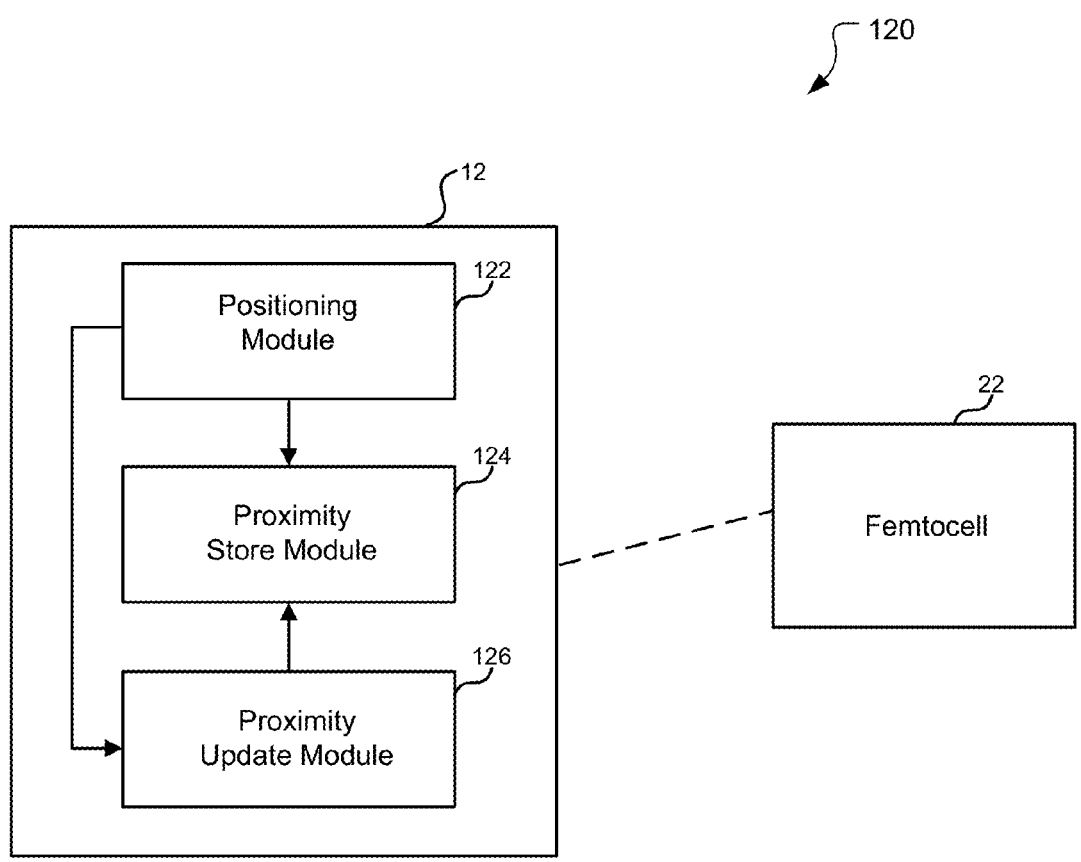
FIG. 4 is a partial functional block diagram of a system for conducting a mobile-based femtocell proximity information update.

In a wireless communication system including femtocells 22, the mobile device 12 memorizes the proximity information of each discovered accessible femtocell, e.g., as shown within system 120 in FIG. 4. Therefore, when the mobile device 12 returns into the proximity of an femtocell 22, the mobile device 12 can increase the search frequency (or start searching) for the proximate femtocell 22 to reduce the discovery time of the femtocell 22. Conversely, when moving out of the proximity of the femtocell 22, the mobile device 12 can reduce the search frequency (or stop searching) to save battery life. As a result of such proximity-based search, femtocell 22 may not transmit beacon signals on the non-femtocell carriers, which would cause interference to the macrocell users, in order to trigger searching for femtocell 22.

In general, techniques are described herein to facilitate updating memorized proximity information. The techniques herein are motivated by at least the following factors. First, stored proximity information for a femtocell 22 may become obsolete under various circumstances. For example, the femtocell 22 may be physically relocated to another area due to the relocation of the owner's house, office, store, etc. Further, the femtocell 22 may be implemented on a mobile platform, such as a bus, train, etc., with wireless backhaul. Second, the femtocell 22 may be shut down due to termination of service (e.g. close of business, switching of service between providers, switching between femtocells 22 of different systems, such as Wi-Fi, WiMax, LTE, CDMA, etc.).

When the proximity information for an femtocell 22 becomes obsolete, the mobile device 12 may nonetheless search for the femtocell 22 whenever it moves into that proximity, which in turn reduces the battery life of the mobile device 12. Additionally, if the mobile device 12 is in connected mode, the mobile device 12 may send false proximity indications to the network due to its obsolete proximity information. As a result, the network may respond by, e.g., configuring unnecessary measurements for femtocells 22, activating measurement gaps (or compressed mode gaps in UMTS) to search for femtocells 22, etc. These responsive measures can cause an increase in the measurement reports from the mobile device 12, a decrease in overall network capacity due to unnecessary compressed mode gaps and/or mobile signaling, and/or wastage of memory resources at the mobile device 12 due to storage of obsolete proximity information. Accordingly, the mobile device 12 can utilize techniques described herein to identify and clean obsolete proximity information.

Second, updates to proximity information associated with an femtocell 22 are conventionally based only on discovery of an femtocell 22 by the mobile device 12. Stated another way, a mobile device 12 is conventionally required to have previously visited an femtocell 22 in order to update its proximity information. This requirement consumes time associated with discovery of unvisited femtocells 22 as well as mobile battery life caused by incorrect searches triggered by outdated proximity information. For example, when the mobile device 12 moves into the proximity of an unvisited accessible femtocell 22, the discovery time to camp on the femtocell 22 could be non-negligible due to the low search frequency, or no search may be performed at all, depending on the out-of-proximity search algorithm of the mobile device. Further, in the event that the mobile device 12 is configured to send proximity indications (e.g., in connected mode) for previously discovered femtocells 22, a mobile device 12 with outdated proximity information may send unnecessary proximity indications to the network, which in turn negatively impacts the capacity of the network. As another example, when the mobile device 12 moves into an area for which it has obsolete stored proximity information, it may consume significant amount of battery life to search for an femtocell 22 in the area which is either no longer in the area or inactive. Accordingly, the mobile device 12 can receive information relating to updated proximity information from an associated network, which in turn enables the mobile device 12 to ascertain newly accessible and/or obsolete APBS proximities.

While various techniques herein may be described in relation to specific network technologies, the described techniques can be applied to any wireless system, such as Wideband CDMA (WCDMA)/High-Speed Packet Access (HSPA), Universal Mobile Telecommunications System (UMTS), LTE, WiMax, Global System for Mobile Communications (GSM), etc., and any suitable cell type (e.g., closed subscriber group (CSG) cells, hybrid cells, etc.). The techniques herein are also applicable to both idle and connected modes with either dedicated-channel or co-channel APBS deployment.

With reference again to FIG. 4, stored proximity information may become obsolete as described above due to reasons such as femtocell relocation or shutdown, and the obsolete information may cause the mobile device 12 to persistently search within the area indentified by outdated proximities. Thus, the mobile device 12 can utilize a mobile-based technique within system 120 to identify and clean obsolete proximity information. To this end, the mobile device 12 can include a positioning module 122 configured to identify a location of the mobile device 12, a proximity store module 124 configured to maintain proximity data for an femtocell 22 and to associate the femtocell 22 with the location of the mobile device 12, and a proximity update module 126 configured to perform at least one search for the femtocell 22 and to update the proximity data maintained for the femtocell 22 according to results of the at least one search. The positioning module 122 and proximity update module 126 are implemented using, e.g., a processor 102 executing software 106 stored on a memory 104. The proximity store module 124 is implemented, e.g., at a memory 104 and controlled via the processor 102 executing software 106 additionally stored on the memory 104.

Mobile-based proximity update can be performed within system 120 based on a "proximity search unit," which is defined as an amount of time (e.g., 1 hour, 1 day, etc.) the mobile device 12 searches for an femtocell 22 in its indicated proximity. Based on this definition, if no femtocell 22 has been found by the proximity update module 126 for N continuous or consecutive proximity search units in each of mobile device's 12 M prior visits to the proximity of that femtocell 22l for positive integers M and N, the mobile device 12 deems the proximity information corresponding to the femtocell 22 obsolete and deletes or discards the proximity information from the proximity store module 124 via the proximity update module 126.

Alternatively, the mobile device 12 can follow a multiple-step approach in which a level of obsoleteness of the proximity information for an femtocell 22 is maintained such that the level of obsoleteness is increased when specified conditions are met. For example, a set of obsoleteness levels can be defined as follows for integers $N_i$ and $M_i$.

Obsoleteness level 1 ($L_1$)=No femtocells found in [$N_1$ continuous proximity search units] in each of [$M_1$ prior visits to that proximity].

Obsoleteness level 2 ($L_2$)=No femtocells found in [$N_2$ continuous proximity search units] in each of [$M_2$ prior visits (after $M_1$) to that proximity]

Obsoleteness level n ($L_n$)=No femtocells found in [$N_n$ continuous proximity search units] in each of [$M_n$ prior visits (after $M_{n-1}$) to that proximity], where $L_n > L_{n-1} > \ldots > L_1$.

With regard to the above example level set, the $N_i$ and $M_i$ parameters need not be interrelated, and the $N_i$ and $M_i$ parameters can be optimized individually.

The mobile device 12 can implement different femtocell search behavior depending on the level of obsoleteness. For example, the proximity update module 126 may search at a decreasing rate or frequency for an femtocell 22 as the level of obsoleteness of the proximity information increases. At the highest level of obsoleteness (e.g., if the level of obsoleteness for a given femtocell 22 exceeds a threshold), the proximity update module 126 may also delete or invalidate the proximity information. Thus, in the above example, the parameter N can be configured to decrease as the level of obsoleteness for a given set of proximity information increases. However, as M and N parameters need not be related for varying levels of obsoleteness, these parameters may be altered in any suitable manner (e.g., increased, decreased, left unchanged) between obsoleteness levels.

Additionally or alternatively, obsoleteness of a given set of proximity information can be determined using a time-based approach, wherein the level of obsoleteness is increased if the femtocell 22 is not found within an allotted period of time or time interval $T_i$ for obsoleteness level i. Similar to the M and N parameters above, the time threshold T can be increased, decreased, or left unchanged between obsoleteness levels, and T need not be related between such levels. Searches for the femtocell 22 during the time threshold $T_i$ can be performed in any suitable manner, e.g., regularly, irregularly, continuously, etc. Further, the number of searches approach described above can be used with the time-based approach as one or more events that can be considered in adjusting the level of obsoleteness. For example, number of searches and search time can be used either in combination or as alternatives such that, e.g., level of obsoleteness is adjusted either (1) after N searches and expiration of T time or (2) after N searches or expiration of T time.

The proximity update module 126 may also alter or otherwise affect the manner in which proximity information corresponding to a femtocell 22 is reported or otherwise transmitted to an associated wireless communication network. As an example, the proximity update module 126 can increase reporting delay for proximity information corresponding to a femtocell 22 in response to increasing the obsoleteness level associated with the femtocell 22. As another example, the proximity update module 126 may alter a transmission schedule or may refrain from sending proximity information reports corresponding to various femtocells 22. In the latter case, the proximity update module 126 may instruct the mobile device 12 not to send reports of proximity information corresponding to a femtocell 22 for which the proximity information has been discarded or proximity information corresponding to a femtocell 22 that exceeds a threshold obsoleteness, thereby reducing the impact on network capacity caused by superfluous reports sent by the mobile device 12.

Figure 5:
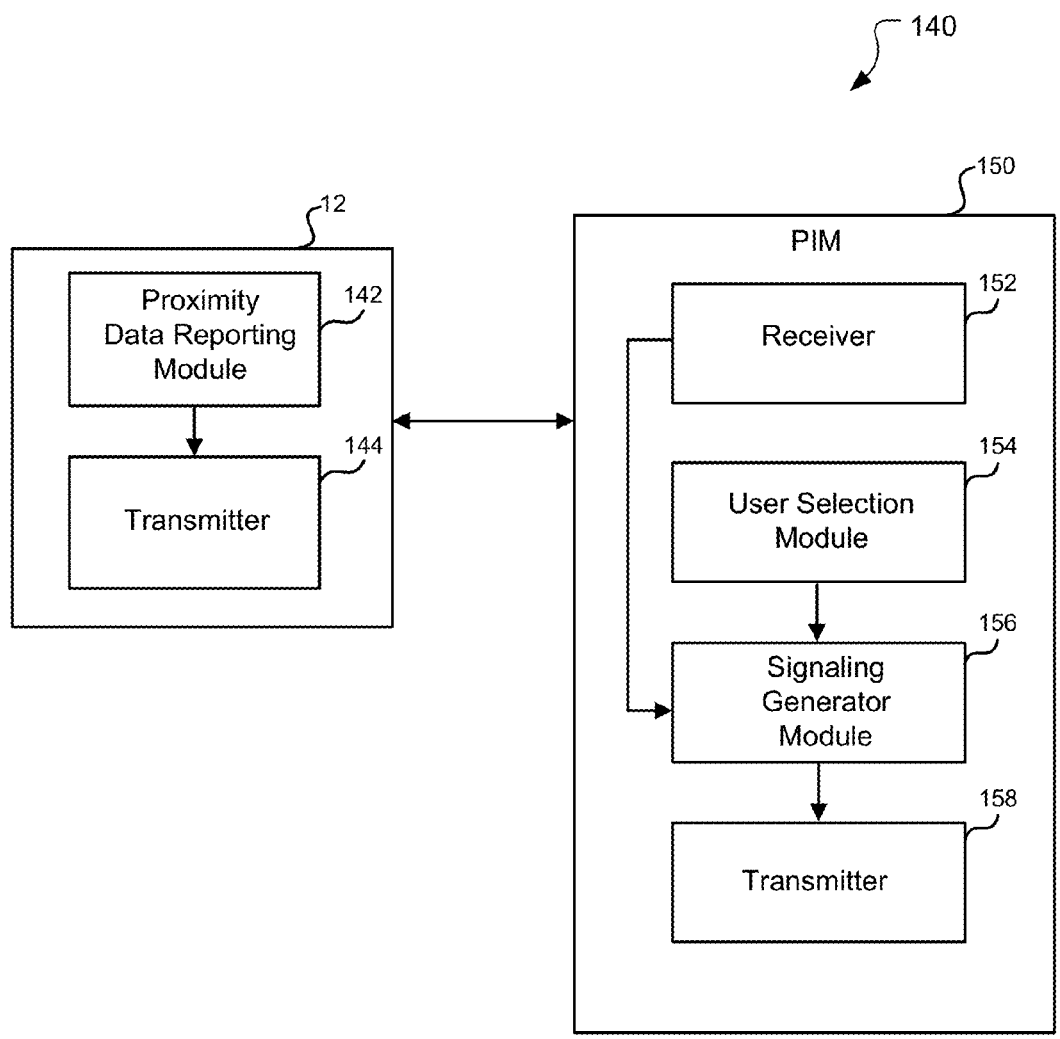
FIG. 5 is a partial functional block diagram of a system for conducting a network-based femtocell proximity information update.

Femtocell proximity information can also be updated using a network-based approach facilitated by a proximity information manager (PIM) 150, as shown by system 140 in FIG. 5. Compared with the mobile-based update described above, the network-based update will inform the mobile device 12 of proximity updates via the network to save various resources of the mobile device 12. For instance, the PIM 150 can directly or indirectly notify the mobile device 12 to add the new proximity information of an unvisited accessible femtocell, so that both battery life and discovery time can be saved at the mobile device 12. Further, the PIM 150 can instruct the mobile device 12 to remove obsolete information of a femtocell, so that battery life and time can be saved for recognizing the obsoleteness of the information.

Figure 6:
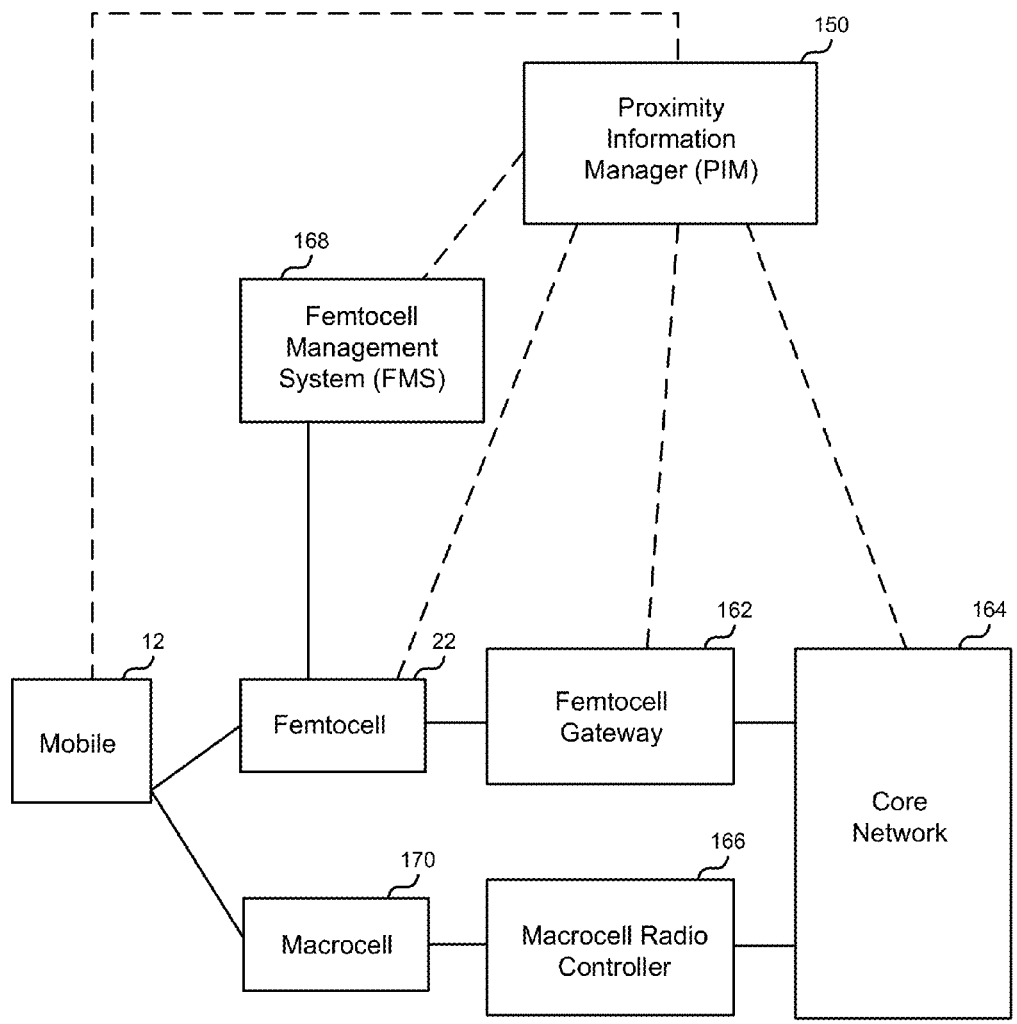
FIG. 6 is a schematic block diagram of various implementations for network-based proximity update in a wireless communication system.

Network-based proximity information update can be implemented via one or more of the communication paths illustrated by FIG. 6. While FIG. 6 illustrates a generic architecture for deployment of femtocells 22, some of the entities shown in FIG. 6 could be optional for some network technologies. Further, some network technologies may utilize entities not shown in FIG. 6. The system shown in FIG. 6 includes a mobile device 12, which may communicate with one or more cells including femtocells 22 and/or macrocells 170. Femtocells 22 are connected to a core network 164 via a femtocell gateway (F-GW) 162, while the macrocells 170 connect to the core network 164 via a macrocell radio controller 166. Further, the femtocell(s) 22 are controlled using a femtocell management system (FMS) 168.

The PIM 150 is a logical entity within a wireless communication system that stores and/or updates information regarding proximity of femtocell(s) 22. The PIM 150 can be implemented via one or more entities shown in FIG. 6 (excluding the mobile device 12), or alternatively the PIM 150 can be a stand-alone entity. The PIM 150 may be associated with, or be independent of, a radio technology utilized by other entities within the network.

By way of specific example, UMTS entities that correspond to those shown in FIG. 6 are provided in Table 1 below. However, other radio technologies can be utilized as noted above.

TABLE 1

Example network entities for femtocell proximity update in UMTS.

| Name of Entity in FIG. 6 | Name of Entity in UMTS |
|---|---|
| Femtocell | Home Node B (HNB) |
| Femtocell Gateway (F-GW) | Home Node B Gateway (HNB-GW) |
| Mobile | User Equipment (UE) |
| Macrocell | Macro or macro cell |
| Core Network | Core Network |
| Macrocell Radio Controller | Radio Network Controller (RNC) |
| Femtocell Management System (FMS) | HNB Management System (HMS) |
| Proximity Information Manager (PIM) | — |

Network-based proximity information updates can be obtained and/or determined by one or more entities within the network as follows. At the mobile device 12, upon detecting a femtocell 22, the mobile device 12 can determine the proximity information of that femtocell by scanning the radio environment to obtain measurements, obtaining a SPS fix, etc. Measurements associated with the radio environment can include nearby macrocell pilot strengths, pilot signal-to-noise ratio (SNR), physical cell identities, carrier frequencies, and associated technologies (e.g. GSM, WCDMA); television and/or radio station signal strength and frequency; etc. The mobile device 12 may report some or all of this information via a proximity data reporting module 142 and a transmitter 144, as shown in FIG. 5. Once transmitted, the PIM 150 may directly or indirectly receive the reported information via a receiver 152 or other means.

A femtocell 22 may also determine its proximity information by itself by performing various actions. These include, e.g., scanning its radio environment, obtaining a SPS fix, utilizing reports and/or messages sent from mobile devices 12 in its vicinity providing information about neighboring cells, using its backhaul to discover other cells around it, etc. Further, the FMS 168 can determine the proximity information of femtocells 22 by, e.g., using the location information or radio information provided by femtocells 22 or using deployment information configured by an operator. In the latter case, when the deployment of femtocells 22 is planned, the FMS 168 is provided with knowledge of the exact location of the respective femtocells 22. Further, the FMS 168 can use both location/radio information from femtocells 22 and the deployment information configured by an operator. For example, a femtocell 22 can provide a physical cell identity of just one macrocell 170 on a frequency around it. Subsequently, the FMS 168, using this rough location of the femtocell 22, can construct proximity information containing physical cell identities of nearby macrocells 170 on all frequencies.

The F-GW 162 may also determine the proximity information of a femtocell 22 by using the location information, radio information or parameter information provided by a femtocell 22 and/or by correlating information provided by all femtocells 22 around the F-GW 162. For example, if a femtocell (Femto-1) cannot scan its radio environment properly but its neighboring femtocell (Femto-2) can, the F-GW 162 can use the radio information provided by Femto-2 to determine the proximity of Femto-1 if the F-GW 162 knows that Femto-1 and Femto-2 are neighbors (e.g., based on the internet protocol (IP) address of the two femtocells 22, etc.). In some cases, the FMS 168 may also perform this correlation.

After the proximity information of a femtocell 22 has been obtained as described above, the information is reported to the PIM 150. This can be done by direct reporting (i.e., one hop), in which the entity that determines or obtains proximity information directly reports that information to the PIM 150. For example, a direct interface can be provided between the PIM 150 and the proximity information obtaining entity. Possible reporting paths to the PIM 150 that can be employed in this manner are shown by dashed lines in FIG. 6.

Alternatively, indirect reporting (i.e., multiple hops) can be used, where the entity that determines or obtains proximity information sends the information to PIM 150 via other entity(ies). The entities in between the source entity and the PIM 150 can either simply relay the information, or such entities can change the structure of the information, modify or filter the information, etc. For example, a femtocell 22 can send the proximity information to a FMS 168, which can in turn send the information to the PIM 150. Indirect reporting paths that can be employed in this manner are represented in FIG. 6 via a combination of solid lines and dashed lines.

Returning to FIG. 5, the PIM 150 also includes a user selection module 154 that identifies one or more network users (e.g., corresponding to mobile devices 12) for which given proximity information is relevant. The user selection module 154 utilizes various functions to determine the users that need the proximity information of a particular femtocell 22. The user selection module 154 can perform this determination on its own, or alternatively the PIM 150 can send the relevant information to another entity for this function to be performed. Relevant users can be determined based on various criteria, such as access restrictions (e.g., for a CSG femtocell 22) or the like.

Once the relevant users are determined, a signaling generator module 156 generates proximity data update signaling based on a proximity data report received as described above. Next, a transmitter 158 sends the proximity information to the relevant users, either at the application level (e.g., by using a transport such as Open Mobile Alliance Device Management (OMA-DM)) or by using technology- (e.g. GSM, WCDMA, etc.) specific messaging. Furthermore, the proximity information can be sent as part of the access control list used by mobile devices 12 to determine their rights to access a femtocell 22. For an example using 3GPP, proximity information can be incorporated as part of a CSG whitelist. Other implementations are also possible.

Transmitter 158 may operate according to various triggers to send proximity information update signaling to relevant users. For example, periodic update can be used, where the network sends proximity information to a user periodically (e.g., once a week, etc.). Modification-triggered update can be used, where the network sends proximity information to a user whenever the proximity information of a femtocell 22 that is of interest to the user is modified, a new femtocell is added or removed, etc. Piggy-backing update can also be used, where transmission of proximity information is tied with transmission of other femtocell-related information. For a non-limiting example using 3GPP, proximity information can be sent together with the updated CSG whitelist whenever the latter is sent to the user. Further, the network can use connected-mode update, where transmission of the proximity information is restricted to only mobile devices 12 in connected mode to save battery. For instance, the latest proximity information can be sent whenever a given mobile device 12 is in connected mode.

Additionally, a joint mobile-based and network-based update can be employed, where both the mobile-based and network-based techniques described above are combined to enable a mobile device 12 to obtain a latest update, thereby improving search efficiency. For example, a network-based update technique can be based on a long periodic trigger and, between the network updates of proximity information, a mobile-based update technique can be used to improve the search efficiency.

Figure 7:
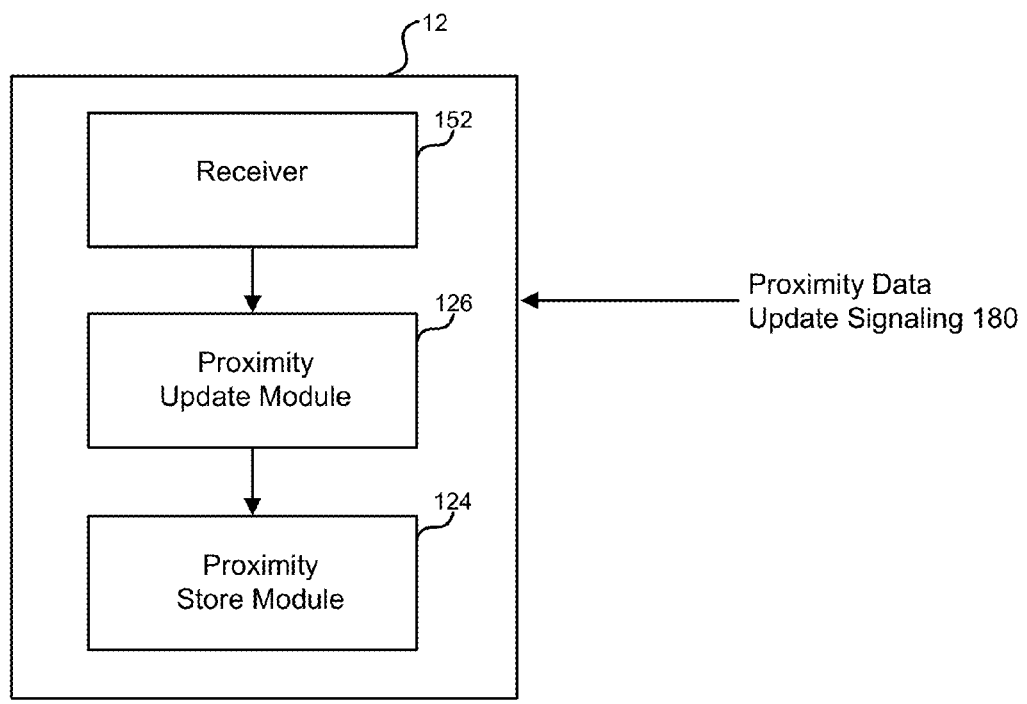
FIG. 7 is another partial functional block diagram of a system for conducting a network-based femtocell proximity information update.

At the mobile device 12, proximity information can be updated according to proximity data update signaling 180 as described above for the network-based update technique as shown by FIG. 7. A proximity store module 124 maintains proximity data for an femtocell 22 as described above. Upon receiving proximity data update signaling relating to the femtocell 22 at a receiver 152, a proximity update module 126 at the mobile device 12 updates the proximity data for the femtocell 22 at the proximity store module 124 based on the received proximity data update signaling 180.

As noted above, the techniques described herein can be applied to various femtocell systems, e.g., WCDMA/HSPA, LTE, WiMax, GSM, etc. The techniques herein are also applicable to both idle and connected modes with either dedicated-channel or co-channel femtocell deployment. Example applications are classified below in further detail. However, other applications are also possible.

For applications in idle mode with a dedicated-channel deployment, the network-based update described above can be used to inform the mobile device 12 of the proximity information of unvisited femtocells 22 such that the mobile device 12 can start searching when moving into those new proximities. Further, both the mobile-based and network-based updates described above can remove the obsolete proximities to prevent searching in said proximities. Furthermore, the network-based update can save both battery life and time associated with recognizing these proximities at the mobile device 12.

For applications in connected mode with a dedicated-channel deployment, the above effects for applications in idle mode with a dedicated-channel deployment apply. Further, when moving into the unvisited proximities in connected mode, a mobile device 12 on a macrocell carrier can request a serving radio controller to send out an inter-frequency measurement configuration message including the compressed mode gap duration if needed.

For applications in idle mode with a co-channel deployment, the above effects for applications in idle mode with a dedicated-channel deployment apply. Further, since both femtocells 22 and macrocells 170 share the same carrier in this case, the mobile device can request to switch off the femtocell transmit power via the network in order to reduce the interference to macrocell users if it is known that the mobile device 12 is not in the femtocell proximity. The mobile device 12 can then request to switch on the femtocell transmit power via the network when it enters into the femtocell proximity.

For applications in connected mode with a co-channel deployment, the above effects for applications in idle mode with a co-channel deployment apply. Further, when moving into unvisited proximities in connected mode, the mobile device 12 can request the serving radio controller to send out the intra-frequency measurement configuration message.

Figure 8:
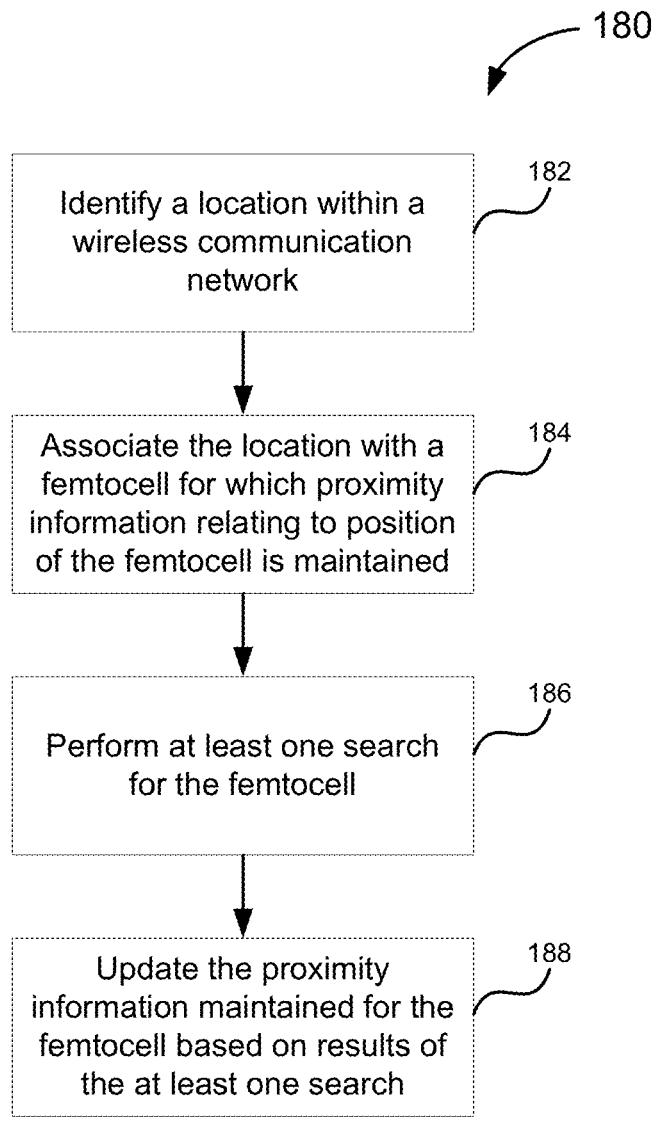
FIGS. 8-10 are block flow diagrams of respective processes of updating femtocell proximity information in a wireless communication environment.

Referring next to FIG. 8, with further reference to FIGS. 1-7, a process 180 of updating femtocell proximity information in a wireless communication environment via mobile-based update includes the stages shown. The process 180 is, however, an example only and not limiting. The process 180 can be altered, e.g., by having stages added, removed, rearranged, combined, and/or performed concurrently. Still other alterations to the process 180 as shown and described are possible.

At stage 182, a location (e.g., of a mobile device 12) within a wireless communication network is identified. The location can be identified by, e.g., a positioning module 122 implemented by a processor 102 executing software 106 stored on a memory 104, and/or by other means. At stage 184, the location is associated with an femtocell 22 for which proximity information relating to position of the APBS is maintained. The proximity information is maintained at a proximity store module 124, which can be implemented via a memory 104, and/or by other suitable storage mechanisms.

At stage 186, at least one search for the femtocell 22 is performed, e.g., by a proximity update module 126 implemented by a processor 102 executing software 106 stored on a memory 104. At stage 188, the proximity information maintained for the femtocell 22 is updated (e.g., via the proximity update module 126) based on the results of the at least one search performed at stage 186.

Figure 9:
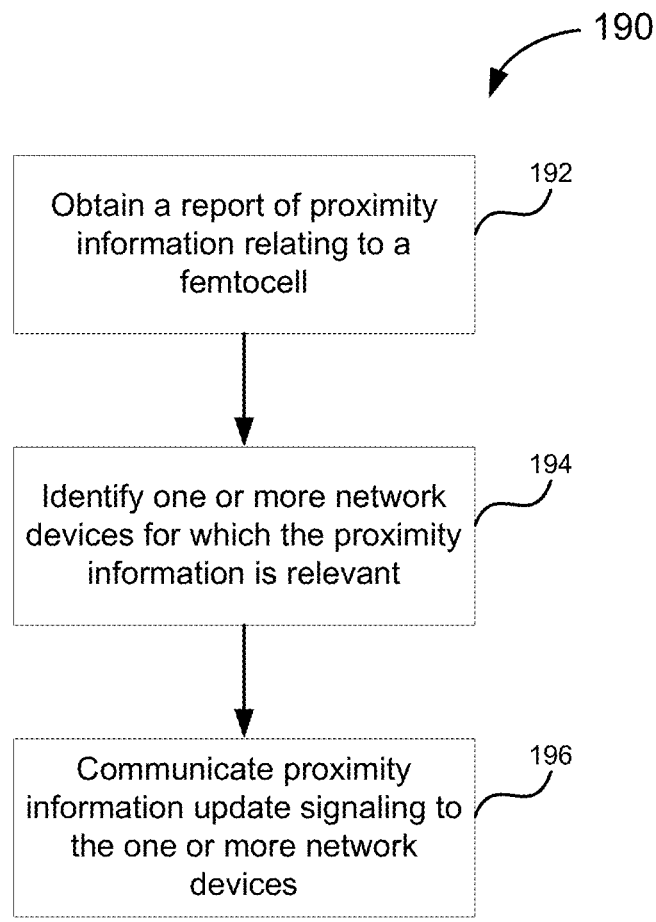

Referring to FIG. 9, with further reference to FIGS. 1-7, a process 190 of updating femtocell proximity information in a wireless communication environment via network-based update includes the stages shown. The process 190 is, however, an example only and not limiting. The process 190 can be altered, e.g., by having stages added, removed, rearranged, combined, and/or performed concurrently. Still other alterations to the process 190 as shown and described are possible.

At stage 192, a report of proximity information relating to an femtocell 22 is obtained. The report can be obtained, e.g., at a PIM 150 from one or more entities shown in FIG. 6, either directly (e.g., via one network transfer) or indirectly (e.g., via multiple network transfers between entities). For example, a PIM 150 can receive a report at stage 192 from a mobile device 12 via a proximity data reporting module 142 and/or a transmitter 144.

At stage 194, one or more network devices, such as mobile devices 12 or the like, are identified for which the proximity information reported at stage 192 is relevant. Relevance of the proximity information to respective users can be determined by, e.g., a user selection module 154 at the PIM based on factors such as access restrictions for various femtocells 22 or other factors. At stage 196, proximity information update signaling 180 is transmitted or otherwise communicated to the one or more network devices identified at stage 194. The information update signaling 180 is reported by, e.g., a signaling generator module 156 and/or a transmitter 158 at the PIM. A user selection module 154 and/or a signaling generator module 156 as used within process 190 can be implemented by various means, such as by a processor 102 executing software 106 stored on a memory 104, etc.

Figure 10:
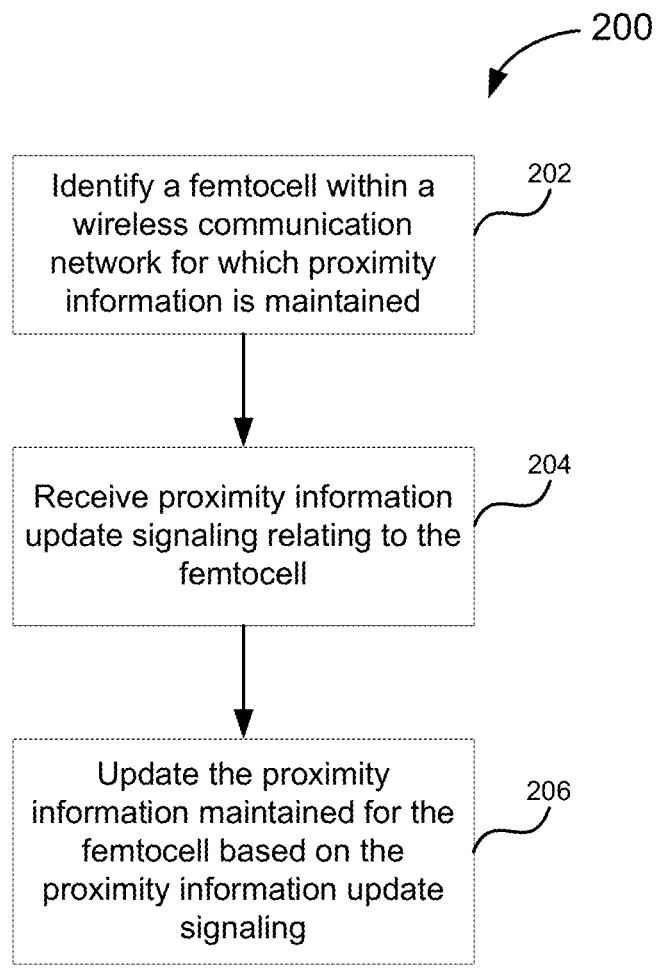

Referring to FIG. 10, with further reference to FIGS. 1-7, an alternate process 200 of updating femtocell proximity information in a wireless communication environment via network-based update includes the stages shown. The process 200 is, however, an example only and not limiting. The process 200 can be altered, e.g., by having stages added, removed, rearranged, combined, and/or performed concurrently. Still other alterations to the process 200 as shown and described are possible.

At stage 202, an femtocell 22 within a wireless communication network for which proximity information is obtained (e.g., at a proximity store module 124 associated with a mobile device 12) is identified. At stage 204, proximity information update signaling 80 relating to the femtocell 22 is received, e.g., by a receiver 152 or the like. At stage 206, the proximity information maintained for the femtocell 22 is updated (e.g., by a proximity update module 126) based on the proximity information update signaling 180 received at stage 204.

One or more of the components, steps, features and/or functions illustrated in FIGS. 1, 2, 3, 4, 5, 6 and/or 7 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 4, 5, 6 and/or 7 may be configured to perform one or more of the methods, features, or steps described in FIGS. 8, 9 and/or 10. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium," "computer-readable medium," and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium," "computer-readable medium," and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A mobile wireless communication device comprising:
   a positioning module configured to identify a location of the device;
   a proximity store module communicatively coupled to the positioning module and configured to maintain proximity data for a femtocell and to associate the femtocell with the location of the device, wherein the proximity data aids the mobile wireless communication device in determining its proximity to the femtocell; and
   a proximity update module communicatively coupled to the proximity store module and configured to perform at least one search for the femtocell, to update the proximity data maintained for the femtocell according to results of the at least one search, to maintain an obsoleteness level for the femtocell, and to discard the proximity data maintained for the femtocell if the femtocell is not found in N consecutive searches in each one of M visits to a proximity of the femtocell, wherein N is a positive integer and M is a positive integer.

2. The device of claim 1, wherein the proximity update module is further configured to discard the proximity data maintained for the femtocell if the femtocell is not found via the at least one search within an allotted time.

3. The device of claim 1, wherein the proximity update module is further configured to update the obsoleteness level of the femtocell according to the results of the at least one search.

4. The device of claim 3, wherein the proximity update module is further configured to discard the proximity data maintained for the femtocell if the obsoleteness level for the femtocell exceeds a threshold.

5. The device of claim 3, wherein the proximity update module is further configured to perform searches for the femtocell at a rate determined according to the obsoleteness level for the femtocell.

6. The device of claim 3, wherein the proximity update module is further configured to increase the obsoleteness level for the femtocell if the femtocell is not found in N consecutive searches conducted at periods of a time interval, wherein N is a positive integer.

7. The device of claim 3, wherein the proximity update module is further configured to increase the obsoleteness level for the femtocell if the femtocell is not found via the at least one search within an allotted time.

8. The device of claim 1, wherein the proximity update module is further configured to update the proximity data maintained for the femtocell according to received proximity update signaling.

9. The device of claim 1, wherein the proximity update module is further configured to modify a schedule on which at least a portion of the proximity data maintained for the femtocell is transmitted to an associated wireless communication network.

10. The device of claim 1, wherein the proximity data is provided to the device by a network based on detection of the femtocell by another mobile wireless communication device.

11. The device of claim 1, wherein the proximity data is provided to the device by a network based on a radio scan performed by another femtocell.

12. The device of claim 1, wherein the proximity data is provided to the device by a network based on deployment information configured by an operator.

13. The device of claim 1, wherein the proximity data is based on detection of the femtocell by the device during a prior visit of the device to the femtocell.

14. A femtocell proximity management system comprising:
   a receiver configured to obtain a proximity data report relating to a femtocell;
   a user selection module configured to identify one or more mobile devices for which the proximity data report is relevant;
   a signaling generator module communicatively coupled to the receiver and configured to generate proximity data update signaling based on the proximity data report, wherein, if the femtocell is not found in N consecutive searches in each one of M visits to a proximity of the femtocell, the proximity data update signaling instructs a mobile device to discard proximity data for the femtocell, wherein N is a positive integer and M is a positive integer; and a transmitter communicatively coupled to the user selection module and the signaling generator module and configured to transmit the proximity data update signaling to the one or more mobile devices identified by the user selection module.

15. The system of claim 14, wherein the user selection module is further configured to identify the one or more mobile devices for which the proximity data report is relevant based on access restrictions of the femtocell.

16. The system of claim 14, wherein the transmitter is further configured to transmit the proximity data update signaling within a transmission of additional information relating to the femtocell.

17. The system of claim 14, wherein the transmitter is further configured to transmit the proximity data update signaling in response to at least one of expiration of an allotted amount of time or a modification of proximity data associated with the femtocell.

18. The system of claim 14, wherein the proximity data update signaling instructs each of the one or more mobile devices to discard proximity data for the femtocell stored on the mobile device when the femtocell is removed from a network.

19. The system of claim 14, wherein the proximity data update signaling instructs each of the one or more mobile devices to store proximity data for the femtocell on the mobile device when the femtocell is added to a network.

20. The system of claim 14, wherein the proximity data report includes a location of the femtocell.

21. A mobile wireless communication device comprising:
a proximity store module configured to maintain proximity data for a femtocell, wherein the proximity data aids the mobile wireless communication device in determining its proximity to the femtocell;

a receiver configured to obtain proximity data update signaling relating to the femtocell, wherein, if the femtocell is not found in N consecutive searches in each one of M visits to a proximity of the femtocell, the proximity data update signaling instructs the mobile wireless communication device to discard the proximity data for the femtocell, wherein N is a positive integer and M is a positive integer; and a proximity update module communicatively coupled to the proximity store module and the receiver and configured to discard the proximity data for the femtocell based on the proximity data update signaling.

22. The device of claim 21, further comprising a transmitter communicatively coupled to the proximity store module and configured to report proximity data relating to one or more femtocells to a proximity information management entity within a wireless communication network or a serving cell within the wireless communication network.

23. The device of claim 21, wherein the receiver is further configured to receive control signaling having the proximity data update signaling embedded therein.

24. The device of claim 21, wherein the proximity update module is further configured to perform at least one search for the femtocell and to update the proximity data maintained for the femtocell according to results of the at least one search.

25. The device of claim 21, wherein the proximity data for the femtocell includes a location of the femtocell.

26. A method comprising:
identifying a location within a wireless communication network;

associating the location with a femtocell for which proximity information relating to a position of the femtocell is maintained, wherein the proximity information aids a mobile wireless communication device in determining its proximity to the femtocell;

performing at least one search for the femtocell; and updating, at the mobile wireless communication device, the proximity information maintained for the femtocell based on results of the at least one search, wherein the updating comprises maintaining an obsoleteness level for the femtocell and discarding the proximity information maintained for the femtocell if the femtocell is not found in N consecutive searches in each one of M visits to a proximity of the femtocell, wherein N is a positive integer and M is a positive integer.

27. The method of claim 26, wherein the performing comprises performing searches for the femtocell at intervals of a proximity search period.

28. The method of claim 26, wherein the updating further comprises discarding the proximity information maintained for the femtocell if the femtocell is not found via the at least one search within an allotted time interval.

29. The method of claim 26, wherein the updating comprises:
increasing the obsoleteness level for the femtocell if the femtocell is not found in one or more of the at least one search.

30. The method of claim 29, wherein the performing comprises performing searches for the femtocell at a rate determined according to the obsoleteness level for the femtocell.

31. The method of claim 29, wherein the updating further comprises discarding the proximity information maintained for the femtocell if the obsoleteness level for the femtocell exceeds an allotted obsoleteness threshold.

32. The method of claim 29, wherein the performing comprises performing searches for the femtocell at intervals of a proximity search period.

33. The method of claim 29, wherein the updating further comprises increasing the obsoleteness level for the femtocell if the femtocell is not found via the at least one search within an allotted time interval.

34. The method of claim 26, wherein the proximity information comprises at least one of satellite positioning system coordinates, cell identifiers, device addresses, media access control (MAC) addresses, observed signal strengths, observed signal-to-noise ratio of at least one of a cellular, television or radio system, observed carrier frequencies or associated radio access technologies.

35. The method of claim 26, further comprising updating the proximity information maintained for the femtocell based on update information received from the wireless communication network.

36. The method of claim 26, wherein the updating further comprises altering a schedule on which at least a portion of the proximity information maintained for the femtocell is transmitted to the wireless communication network.

37. A method comprising:
obtaining a report of proximity information relating to a femtocell;

identifying one or more mobile devices for which the proximity information is relevant; and communicating proximity information update signaling to the one or more mobile devices, wherein, if the femtocell is not found in each one of M visits to a proximity of the femtocell, the proximity information update signaling instructs a mobile device to discard proximity information for the femtocell, wherein N is a positive integer and M is a positive integer.

38. The method of claim 37, wherein the obtaining comprises obtaining the report from at least one of the mobile device, the femtocell, a femtocell management system or a femtocell gateway.

39. The method of claim 37, wherein the identifying comprises identifying the one or more mobile devices based on access restrictions of the femtocell.

40. The method of claim 37, wherein the communicating comprises communicating the proximity information update signaling within a transmission of additional information relating to the femtocell.

41. The method of claim 40, wherein the communicating further comprises communicating the proximity information update signaling to ones of the one or more mobile devices operating in a connected mode.

42. The method of claim 37, wherein the communicating comprises communicating the proximity information update signaling based on at least one of a transmission period or a modification of parameters related to the femtocell.

43. A method comprising:
identifying a femtocell within a wireless communication network for which proximity information is maintained, wherein the proximity information aids a mobile wireless communication device in determining its proximity to the femtocell;
receiving proximity information update signaling relating to the femtocell, wherein, if the femtocell is not found in N consecutive searches in each one of M visits to a proximity of the femtocell, the proximity information update signaling instructs the mobile wireless communication device to discard the proximity information for the femtocell, wherein N is a positive integer and M is a positive integer; and
discarding the proximity information maintained for the femtocell based on the proximity information update signaling.

44. The method of claim 43, further comprising reporting proximity information relating to one or more femtocells to a proximity information management entity within the wireless communication network.

45. The method of claim 43, further comprising reporting proximity information relating to one or more femtocells to a serving cell within the wireless communication network.

46. The method of claim 43, wherein the receiving comprises receiving the proximity information update signaling embedded within a transmission of control signaling from the wireless communication network.

47. A mobile wireless communication device comprising:
means for identifying a location of the device;
means for maintaining proximity data for a femtocell, wherein the proximity data aids the mobile wireless communication device in determining its proximity to the femtocell;
means for associating the femtocell with the location of the device;
means for performing at least one search for the femtocell; and
means for updating the proximity data maintained for the femtocell according to results of the at least one search, wherein the means for updating is configured to maintain an obsoleteness level for the femtocell and to discard the proximity data maintained for the femtocell if the femtocell is not found in N consecutive searches in each one of M visits to a proximity of the femtocell, wherein N is a positive integer and M is a positive integer.

48. The device of claim 47, wherein the means for updating is configured to update the obsoleteness level of the femtocell according to the results of the at least one search.

49. The device of claim 48, wherein the means for updating is configured to increase the obsoleteness level for the femtocell upon at least one selected event from a plurality of events, and wherein the plurality of events comprise the femtocell not being found in N searches for a positive integer N and the femtocell not being found within an allotted time.

50. The device of claim 48, wherein the means for updating is configured to perform at least one of discarding the proximity data maintained for the femtocell or decreasing a rate at which the means for performing searches for the femtocell if the obsoleteness level for the femtocell exceeds a threshold.

51. A femtocell proximity management system comprising:
means for receiving a proximity data report relating to a femtocell;
means for identifying one or more mobile devices for which the proximity data report is relevant;
means for generating proximity data update signaling based on the proximity data report, wherein, if the femtocell is not found in N consecutive searches in each one of M visits to a proximity of the femtocell, the proximity data update signaling instructs a mobile device to discard proximity data for the femtocell, wherein N is a positive integer and M is a positive integer; and
means for transmitting the proximity data update signaling to the one or more mobile devices identified by the means for identifying.

52. The system of claim 51, wherein the means for transmitting is configured to transmit the proximity data update signaling within a transmission of additional information relating to the femtocell.

53. The system of claim 51, wherein the means for transmitting is configured to transmit the proximity data update signaling in response to at least one of expiration of an allotted amount of time or a modification of proximity data associated with the femtocell.

54. A mobile wireless communication device comprising:
means for maintaining proximity data for a femtocell, wherein the proximity data aids the mobile wireless communication device in determining its proximity to the femtocell;
means for receiving proximity data update signaling relating to the femtocell, wherein, if the femtocell is not found in N consecutive searches in each one of M visits to a proximity of the femtocell, the proximity data update signaling instructs the mobile wireless communication device to discard the proximity data for the femtocell, wherein N is a positive integer and M is a positive integer; and
means for discarding the proximity data for the femtocell based on the proximity data update signaling.

55. The device of claim 54, wherein the means for receiving is configured to receive control signaling having the proximity data update signaling embedded therein.

56. A computer program product residing on a non-transitory processor-readable medium and comprising processor-readable instructions configured to cause a processor to:
identify a location within a wireless communication network;
associate the location with a femtocell for which proximity information relating to position of the femtocell is maintained, wherein the proximity information aids a mobile wireless communication device in determining its proximity to the femtocell;

perform at least one search for the femtocell; and update, at the mobile wireless communication device, the proximity information maintained for the femtocell based on results of the at least one search, wherein updating comprises maintaining an obsoleteness level for the femtocell and discarding the proximity information maintained for the femtocell if the femtocell is not found in N consecutive searches in each one of M visits to a proximity of the femtocell, wherein N is a positive integer and M is a positive integer.

57. The computer program product of claim 56, wherein the instructions configured to cause the processor to update are configured to cause the processor to update the obsoleteness level of the femtocell according to the results of the at least one search.

58. The computer program product of claim 57, wherein the instructions configured to cause the processor to update are configured to cause the processor to discard the proximity data maintained for the femtocell or decrease a rate at which searches are performed for the femtocell if the obsoleteness level for the femtocell exceeds a threshold.

59. A computer program product residing on a non-transitory processor-readable medium and comprising processor-readable instructions configured to cause a processor to:

obtain a report of proximity information relating to a femtocell;

identify one or more mobile devices for which the proximity information is relevant; and communicate proximity information update signaling to the one or more mobile devices, wherein, if the femtocell is not found in N consecutive searches in each one of M visits to a proximity of the femtocell, the proximity information update signaling instructs a mobile device to discard proximity information for the femtocell, wherein N is a positive integer and M is a positive integer.

60. The computer program product of claim 59, wherein the instructions configured to cause the processor to communicate are configured to cause the processor to transmit the proximity information update signaling within a transmission of additional information relating to the femtocell.

61. The computer program product of claim 59, wherein the instructions configured to cause the processor to communicate are configured to cause the processor to transmit the proximity information update signaling in response to at least one of expiration of an allotted amount of time or a modification of proximity information associated with the femtocell.

62. A computer program product residing on a non-transitory processor-readable medium and comprising processor-readable instructions configured to cause a processor to:

identify a femtocell within a wireless communication network for which proximity information is maintained, wherein the proximity information aids a mobile wireless communication device in determining its proximity to the femtocell;

receive proximity information update signaling relating to the femtocell, wherein, if the femtocell is not found in N consecutive searches in each one of M visits to a proximity of the femtocell, the proximity information update signaling instructs the mobile wireless communication device to discard the proximity information for the femtocell, wherein N is a positive integer and M is a positive integer; and discard the proximity information maintained for the femtocell based on the proximity information update signaling.

63. The computer program product of claim 62, wherein the instructions configured to cause the processor to receive are configured to cause the processor to receive control signaling having the proximity information update signaling embedded therein.

64. A mobile wireless communication device comprising:

a positioning module configured to identify a location of the device;

a proximity store module communicatively coupled to the positioning module and configured to maintain proximity data for a femtocell and to associate the femtocell with the location of the device, wherein the proximity data aids the mobile wireless communication device in determining its proximity to the femtocell; and a proximity update module communicatively coupled to the proximity store module and configured to perform at least one search for the femtocell, to update the proximity data maintained for the femtocell according to results of the at least one search, to maintain an obsoleteness level for the femtocell, and to update the obsoleteness level according to the results of the at least one search and according to results of searches performed during a plurality of prior visits to a proximity of the femtocell.

* * * * *